(12) United States Patent
Kobayashi

(10) Patent No.: US 7,187,457 B2
(45) Date of Patent: Mar. 6, 2007

(54) APPARATUS FOR MEASURING SIZES OF ARTICLES

(75) Inventor: Masaaki Kobayashi, Tokyo (JP)

(73) Assignee: Shinko Denshi Co., Ltd., Tokyo (JP)

( * ) Notice: Subject to any disclaimer, the term of this patent is extended or adjusted under 35 U.S.C. 154(b) by 427 days.

(21) Appl. No.: 10/780,871

(22) Filed: Feb. 19, 2004

(65) Prior Publication Data

US 2004/0184042 A1    Sep. 23, 2004

(30) Foreign Application Priority Data

Feb. 24, 2003  (JP)  ............................. 2003-046105

(51) Int. Cl.
G01B 11/10   (2006.01)
(52) U.S. Cl. .................. 356/639; 250/559.12; 702/167
(58) Field of Classification Search ........ 356/625–629, 356/634–639, 601, 607, 608, 613; 209/586, 209/579; 250/559.12, 559.19
See application file for complete search history.

(56) References Cited

U.S. PATENT DOCUMENTS

| | | | | |
|---|---|---|---|---|
| 4,192,613 A | * | 3/1980 | Hammar | ..................... 356/639 |
| 4,773,029 A | * | 9/1988 | Claesson et al. | ............ 702/167 |
| 4,914,307 A | * | 4/1990 | Kanev | .................... 250/559.12 |
| 5,113,591 A | * | 5/1992 | Connelly | ...................... 33/550 |
| 5,251,156 A | * | 10/1993 | Heier et al. | ................. 702/167 |
| 5,469,262 A | * | 11/1995 | Keen et al. | ................. 356/639 |
| 6,380,503 B1 | * | 4/2002 | Mills et al. | ................. 209/586 |

* cited by examiner

*Primary Examiner*—Layla G. Lauchman
(74) *Attorney, Agent, or Firm*—Posz Law Group, PLC

(57) ABSTRACT

An apparatus for measuring sizes of articles including a light projecting device for projecting light toward an article placed on a stationary transparent plate from one side of the plate, a photo-sensor device arranged on the other side of the plate and having plural photo-detectors arranged in array in Y direction to receive light projected from the light projecting device and impinging upon the photo-sensor device without being interrupted by the article, a driving device for reciprocally moving the light projecting device and photo-sensor device relative to the article in X direction perpendicular to the Y direction, and a shifting device for shifting the photo-sensor device in the Y direction between first and second positions which are mutually separated by a half of a photo-detector array.

12 Claims, 5 Drawing Sheets

Fig.6
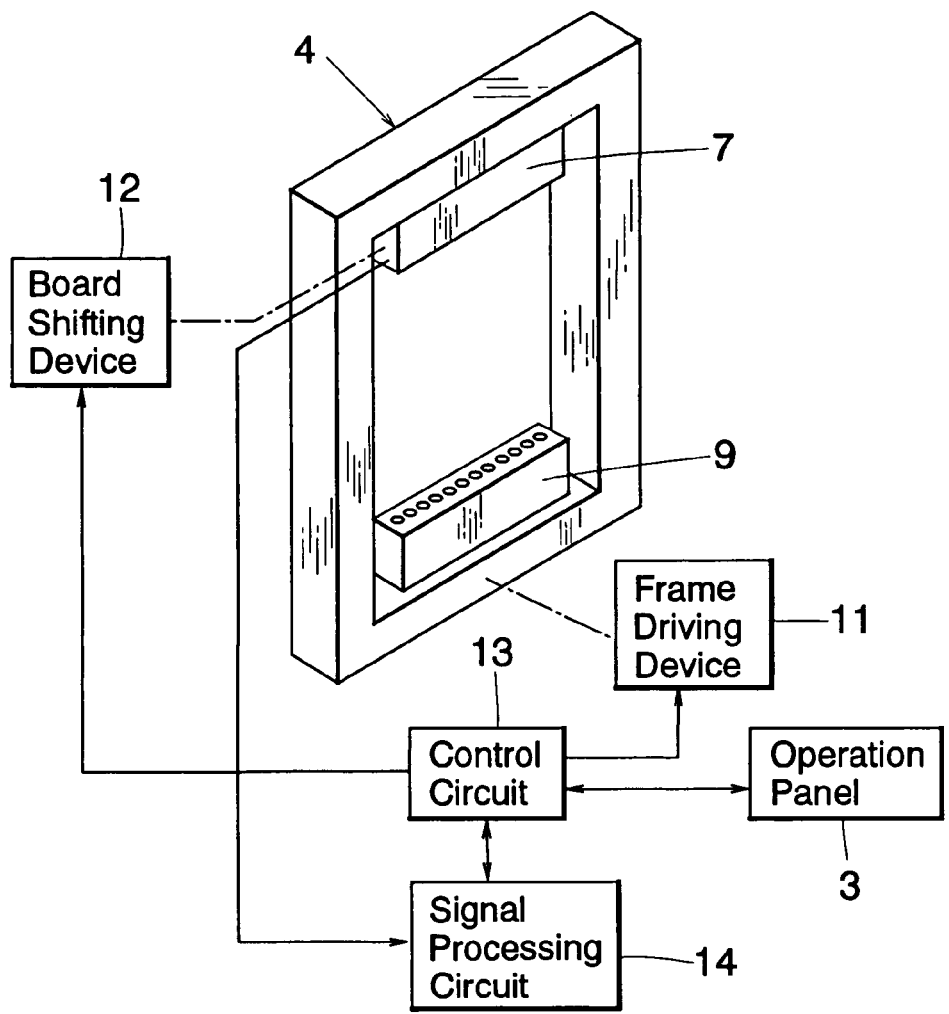
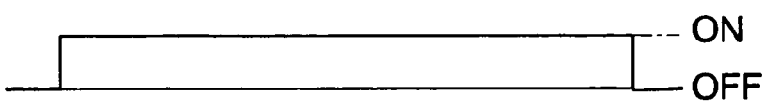
Fig.7A
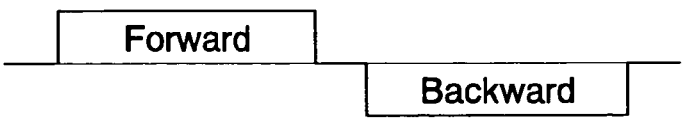
Fig.7B
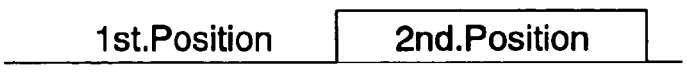
Fig.7C
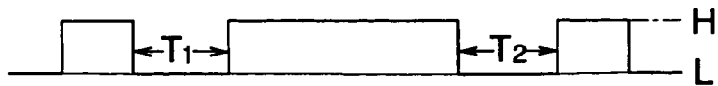
Fig.7D

APPARATUS FOR MEASURING SIZES OF ARTICLES

BACKGROUND OF THE INVENTION

Field of the Invention

The present invention relates to an apparatus for measuring sizes of articles in a non-contact manner with the aid of an optical scanning technique, and more particularly to an apparatus for measuring sizes of two-dimensionally projected images of articles with a high resolution.

In measuring sizes of articles, there has been frequently used an apparatus for measuring a size of a projected image of the article with aid of an optical scanning unit comprising a light projecting device and photo-sensor device having a photo-detector array. Upon measuring a size of an article, the light projecting device projects a substantially parallel light flux toward the article and light emitted from the light projecting device and impinging upon the photo-sensor device without being interrupted by the article is received by one or more photo-detectors in the array. When the article is small, a larger number of photo-detectors receive light, but when the article is large, a smaller number of photo-detectors receive light. Therefore, by suitably processing output signals generated from the photo-detectors, a size of the article in a direction in which the photo-detectors are arranged can be measured.

In such a measuring apparatus, a measuring resolution generally depends on a pitch of the photo-detectors in array. That is to say, when photo-detectors are arranged at a smaller pitch, a resolution becomes higher. Therefore, in order to increase a measuring resolution, a pitch of the photo-detectors must be reduced, and thus the number of photo-detectors has to be increased.

Moreover, it is difficult to attain a high measuring resolution owing to the fact that the photo-detectors could not be arranged tightly to be overlapped with each other. Therefore, a measuring resolution is limited to a value corresponding to a minimum pitch of the photo-detectors in the array and a finer resolution than that of the minimum pitch of photo-detectors could not be obtained unless applying a special optical system, e.g. enlarging optical system. It should be noted that such a special optical system is liable to make the measuring apparatus complicated in structure and expensive in cost.

SUMMARY OF THE INVENTION

An object of this invention is to solve the above-mentioned problems and provide a measuring apparatus which can measure precisely sizes of articles with a resolution higher than a pitch at which a plurality of photo-detectors are arranged in an array.

In order to attain the aforesaid object, an apparatus for measuring sizes of articles according to the present invention comprises:

a light projecting device for projecting light toward an article from one side of the article;

a photo-sensor device arranged on the other side of the article and including a plurality of photo-detectors arranged in array in a first direction such that light projected from said light projecting device and impinging upon the photo-sensor device without being interrupted by the article is received by one or more photo-detectors;

a driving device for reciprocally moving said article and said light projecting device and photo-sensor device relative to each other in a second direction perpendicular to said first direction;

a shifting device for shifting said photo-sensor device in said first direction into at least first and second positions which are mutually separated by a distance smaller than a pitch at which said photo-detectors are arranged in array;

a control device for controlling said driving device and shifting device such that when said article and light projecting device and photo-sensor device are moved by said driving device in a forward direction, said photo-sensor device is in said first position and when said article and light projecting device and photo-sensor device are moved by said driving device in a backward direction, said photo-sensor device is in said second position; and a signal processing device for processing output signals generated from said photo-detectors under a control of a control signal supplied from said control device to measure size of the article with a resolution higher than the pitch at which said photo-detectors are arranged in array.

In a preferable embodiment of the measuring apparatus according to the invention, the photo-detectors are arranged in a single array at a pitch L and said distance D between the first and the second positions of the photo-sensor device is set to a half of the pitch L. Then, an effective resolution equal to L/2 can be attained. In general, the distance D may be set to $nL+L/2$ ($n=0, 1, 2 ---$).

BRIEF DESCRIPTION OF THE DRAWINGS

FIG. 6 is a block diagram illustrating the measuring apparatus; and

FIGS. 7A–7D are signal waveforms for explaining the operation of the measuring apparatus.

DESCRIPTION OF THE PREFERRED EMBODIMENTS

Now the present invention will be explained in detail with reference to embodiments shown in the acompanying drawings.

Figure 1:
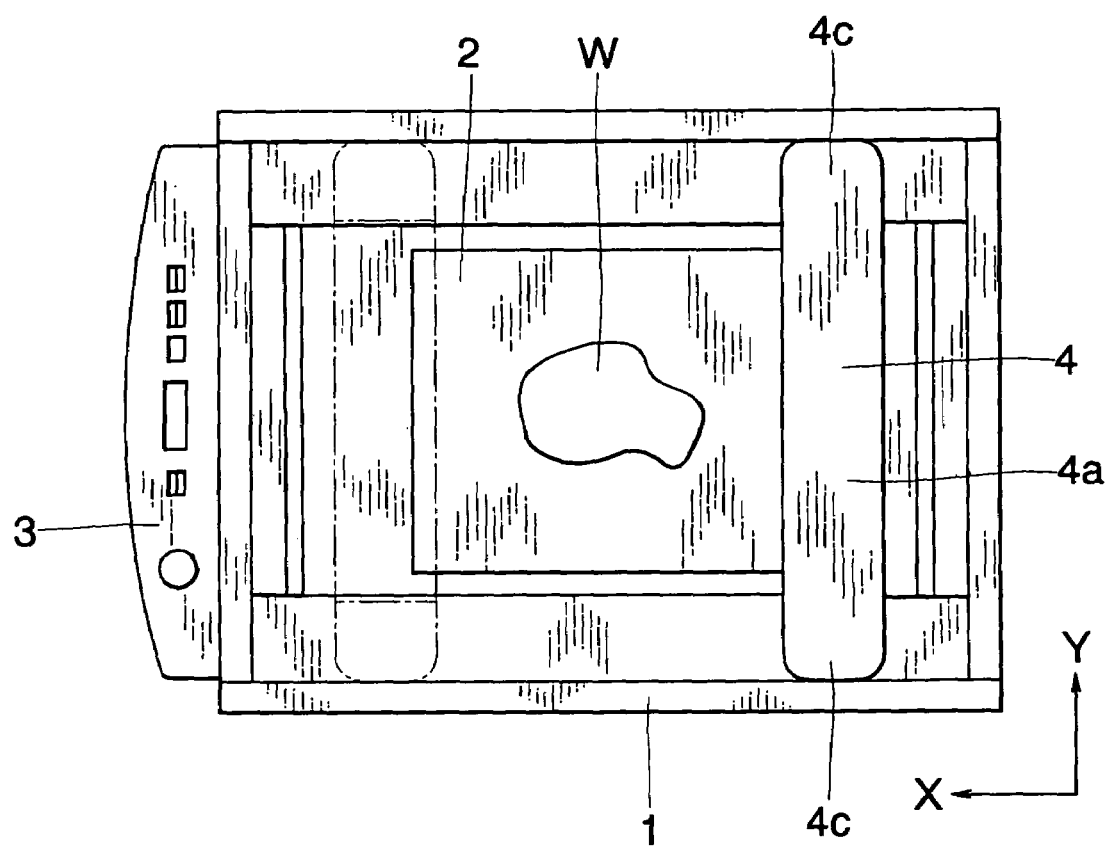
FIG. 1 is a plain view showing an embodiment of the measuring apparatus according to the invention.
Figure 2:
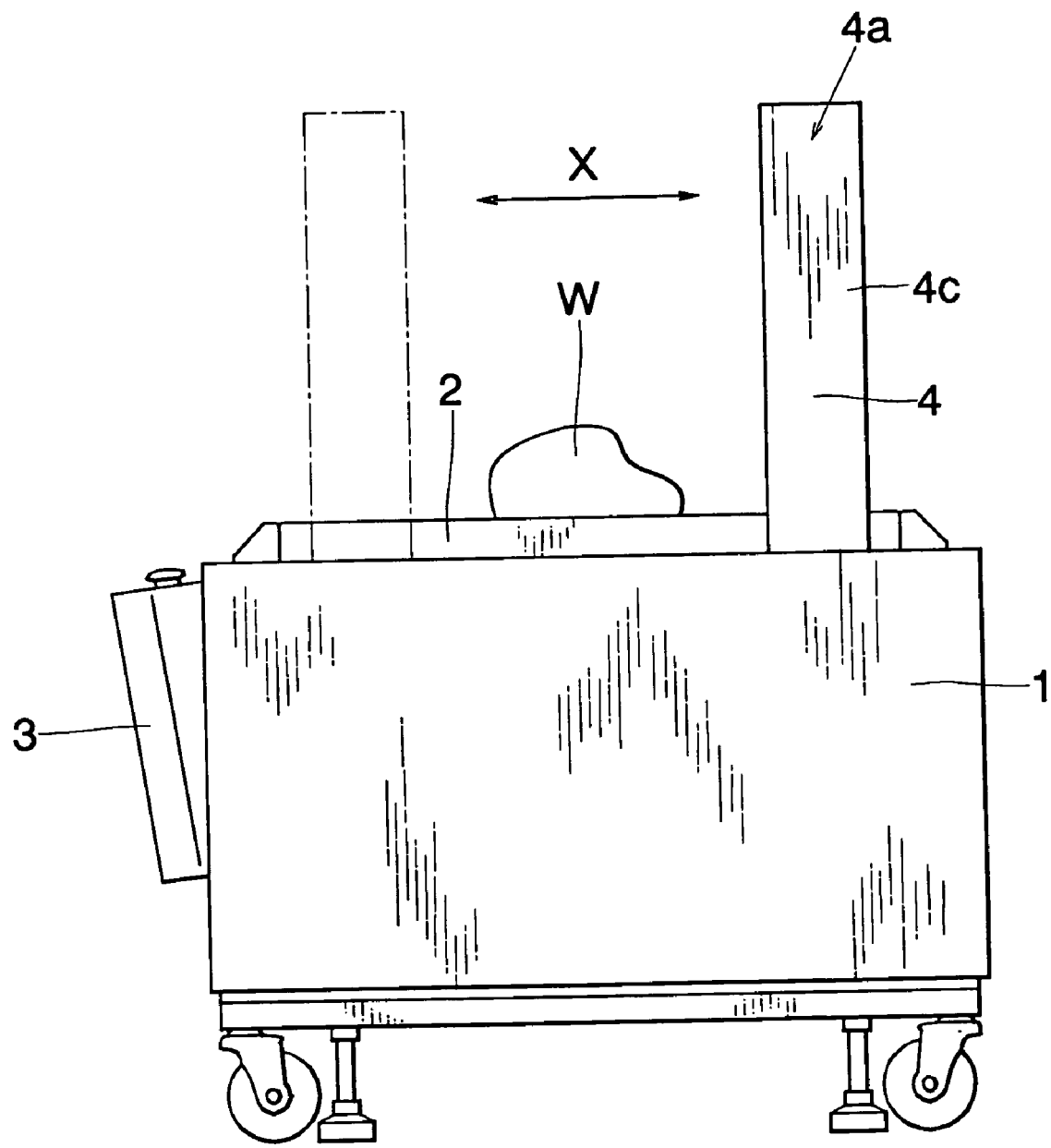
FIG. 2 is a side view thereof.
Figure 3:
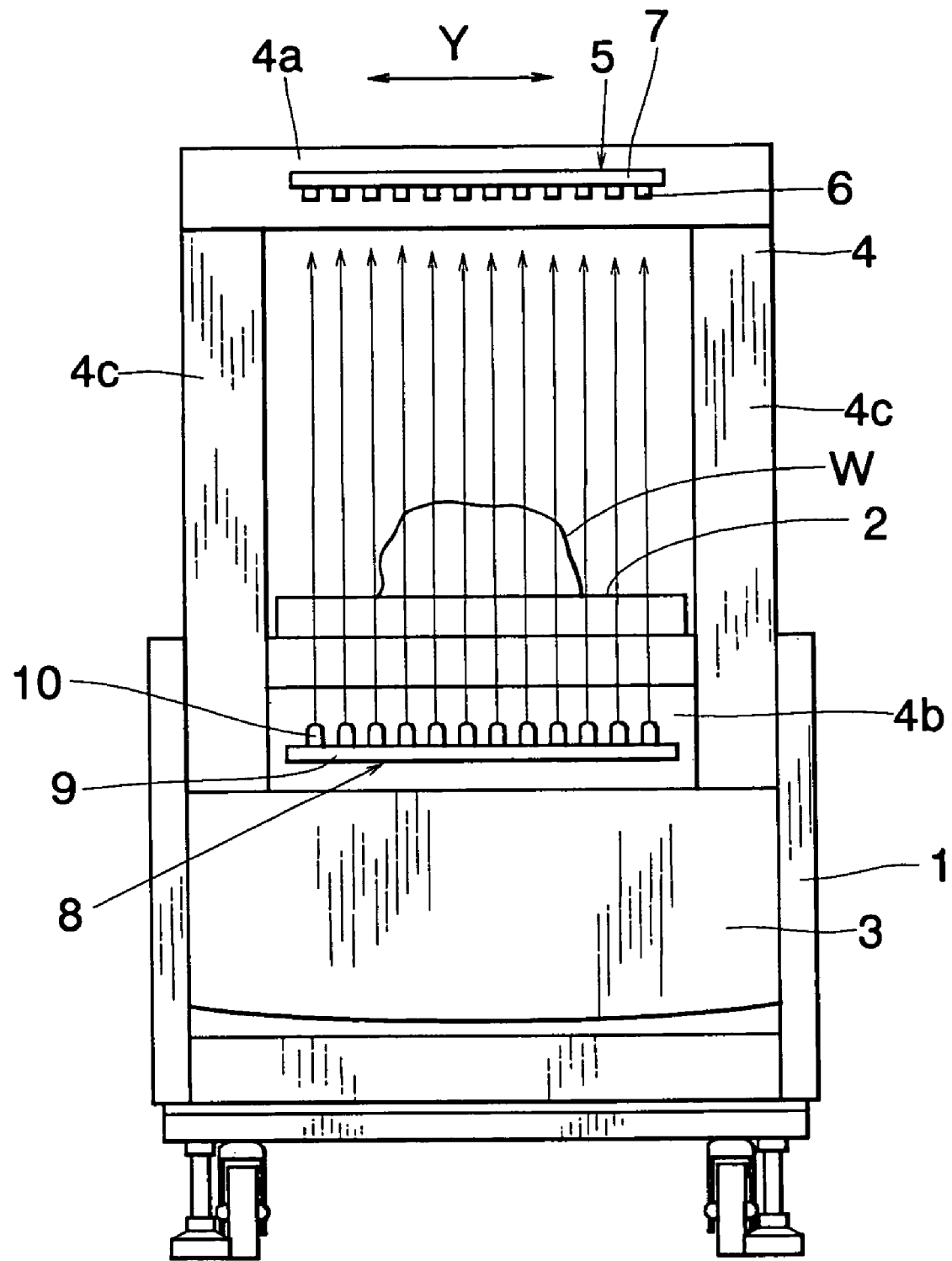
FIG. 3 is a cross sectional view thereof while a part of front portion is cut out.

FIG. 1 is a plan view illustrating an embodiment of the apparatus for measuring sizes of articles and FIG. 2 is a side view thereof. FIG. 3 is a cross sectional view of the measuring apparatus wherein a part of a front portion is cut out. On a top portion of a housing 1 is arranged a transparent glass plate 2 on which an article W to be measured is placed, and an operation panel 3 is provided on a front portion of the housing 1. On the top portion of the housing 1, there is arranged a frame 4 including an upper horizontal portion 4a, a lower horizontal portion 4b (not shown in FIG. 1, but shown in FIG. 3) and upright posts 4c extending upright on both sides of glass plate 2. The frame 4 is movable back and forth in the X direction with respect to the glass plate 2.

Figure 4:
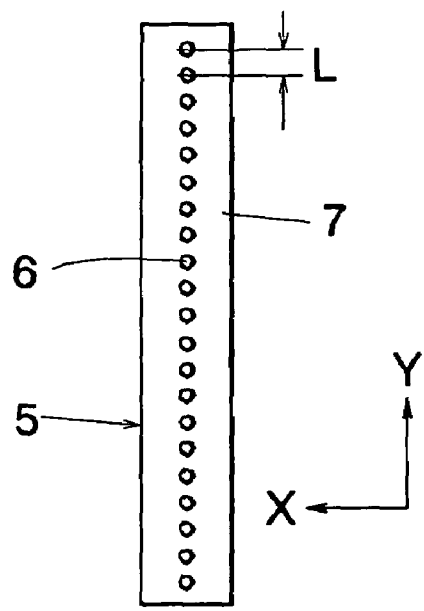
FIG. 4 is a schematic view representing an arrangement of photo-detectors.

On the upper horizontal portion 4a of the frame 4 is arranged a photo-sensor device 5 including plural photo-detectors 6 and a board 7 on which the photo-detectors 6 are arranged in array. The photo-detectors 6 may be formed by, for example, photo-diodes and photo-transistors and are arranged equidistantly in the Y direction perpendicular to the X direction to form an array with a pitch L as shown in FIG. 4. In the present embodiment, the photo-detectors 6 are arranged with a pitch L of 4 mm. According to the invention, the photo-detectors 6 are arranged on the board 7 and the board 7 is provided on the upper horizontal portion 4a movably in the Y direction between a first position and a second position which are separated by a distance D in the Y direction. In the present embodiment, the distance D is set to a half of the pitch L of the photo-detector array (D=L/2=2 mm). A board shifting device for moving the board 7 may be formed by any conventional driving mechanism including a linear guide and solenoid or cylinder or cam.

On the lower horizontal portion 4b of the frame 4, there is arranged a light projecting device 8 including a board 9 and plural light emitting elements 10 such as light emitting diodes arranged in array on the board 9. The array of the light emitting elements 10 is in parallel with the array of the photo-detectors 6 of the photo-sensor device 5 such that light beams emitted from the light emitting elements 10 are transmitted through the glass plate 2 and impinge upon the photo-detectors 6 of the photo-sensor device 5. In the present embodiment, the number of the light emitting elements 10 is identical with that of photo-detectors 6 and light beams emitted from respective light emitting elements 10 are selectively made incident upon corresponding photo-detectors 6. To this end, light shielding plates are provided between successive light emitting elements 10. For the sake of clarity, the light shielding plates are not shown in the drawings.

In the present embodiment, the frame 4 is reciprocally moved in the X direction over a distance which is sufficiently longer than a size of the article W in the X direction. Therefore, the photo-sensor device 5 and light projecting device 8 arranged on the frame 4 are moved reciprocally in the X direction to scan optically the article W.

FIG. 6 is a schematic diagram showing the construction of the measuring apparatus of the present embodiment. A frame driving device 11 for reciprocally moving the frame 4 relative to the glass plate 2 and a board shifting device 12 for shifting the board 7 of the photo-sensor device 5 in the Y direction are connected to a control circuit 13 together with various operation switches and buttons and display panel provided on the operation panel 3, the photo-detectors 6 and the light emitting elements 10. Output signals generated from the photo-detectors 6 are supplied to a signal processing circuit 14. In the signal processing circuit 14, these output signals are suitably processed under a control of a control signal supplied from the control circuit 13.

Upon measurement, the article W is placed on the glass plate 2 and a start switch provided on the operation panel 3 is actuated. Then, the light emitting elements 10 are energized to emit light beams toward corresponding photo-detectors 6 as depicted in FIG. 7A. At first, the board 7 of the photo-sensor device 5 is in the first position as shown in FIG. 7B. The control circuit 13 supplies a driving signal to the frame driving device 11 to move forwardly the frame 4 in the X direction as illustrated in FIG. 7C. During this forward movement, the parallel light beams are projected from the light emitting elements 10 toward the article W through the glass plate 2 and light beams which are made incident upon the photo-sensor device 5 without being interrupted by the article W are received by one or more photo-detectors 6 and output signals from the photo-detectors 6 are supplied to the signal processing circuit 14 and are stored therein.

After the forward movement of the frame 4 has been completed, the control circuit 13 supplies a shifting signal to the board shifting device 12 and the board 7 of the photo-sensor device 5 is moved in the Y direction into the second position as depicted in FIG. 7C. After that, the control circuit 14 supplies a driving signal to the frame driving device 11 to move the frame 4 backwardly in the X direction as shown in FIG. 7B. Also during this backward movement, output signals generated from the photo-detectors 6 are supplied to the signal processing circuit 14 and stored therein. When the frame 4 is moved into the initial home position, the movement of the frame 4 is stopped and the light emitting elements 10 are de-energized as shown in FIG. 7A, and after that the board 7 of the photo-sensor device 5 is moved backward into the first position.

In this manner, the article W can be optically scanned both in the X direction and Y direction. In the signal processing circuit 14, a time interval T from an instance at which at least one photo-detector does not receive light (this situation is denoted as L level in FIG. 7D) to an instance at which all the photo-detectors receive light (this situation is denoted as H level in FIG. 7D) is derived. Since a speed V at which the frame 4 is moved is constant and is known, a size Sx of the article W in the X direction can be measured as a distance over which the frame 4 has been moved during said time interval T (Sx=V×T). Alternatively, when the frame driving device 11 includes a pulse motor, a distance over which the frame 4 has been moved during said time interval T may be derived by counting the number of pulses by means of which the frame 4 has been moved during said time interval T. The photo-detectors 6 are shifted only in the Y direction, a size of the article W in the X direction can be derived from the output signals from the photo-detectors 6 during any one of the forward and backward movements. However, it is preferable to derive a final size of the article W in the X direction as an average between two sizes calculated from a time interval $T_1$ obtained in the forward movement and a time interval $T_2$ obtained in the backward movement as depicted in FIG. 7D showing the output of the photo-sensor device 5.

If a size of the article W in the X direction is calculated from the output signals from the photo-detectors 6 during either one of the forward and backward movements of the frame 4, a size of the article W is measured with a resolution which is identical with the pitch L of the photo-detector array. In the present embodiment, the resolution is 4 mm. However, according to the invention, after the forward movement of the frame 4 in the X direction, the board 7 on which the photo-detectors 6 are arranged into array is sifted in the Y direction by a distance equal to a half of the pitch L (L/2=2 mm). Therefore, an apparent pitch of the photo-detectors 6 is decreased to a half of the actual pitch L. In the present embodiment, by calculating a size of the article W in the Y direction from the output signals generated from the photo-detectors 6 during both the forward and backward movements, a size of the article in the Y direction can be measured with an effective resolution of 2 mm.

In the present embodiment, the number of the light emitting elements 10 is identical with that of the photo-detectors 6 and the light emitting elements and photo-detectors are arranged to be corresponding to each other one by one. However, according to the invention, it is not necessary to arrange the light emitting elements 10 and photo-detectors 6 in the above mentioned manner. Moreover, according to the invention, it is not always necessary to emit parallel light beams simultaneously from all the light emitting elements 10. For instance, the light emitting elements 10 may be successively energized and output signals supplied from the photo-detectors 6 may be successively taken in.

It should be noted that a resolution for measuring a size of the article W in the X direction is not defined primarily but is determined by various factors such as a moving velocity of the frame 4 and a sampling period at which the output signals from the photo-detectors 6 are taken in.

By means of the measuring apparatus according to the invention, not only size of the article in the X and Y directions, but also a contour configuration of a two-dimensional image of the article can be measured, because the articles is scanned two-dimensionally in the X and Y directions.

In a modification of the above embodiment of the measuring apparatus according to the invention, the board 7 on which the photo-detectors 6 are arranged is movably arranged over a distance equal to three quarters of the pitch L at which the photo-detectors are arranged in array, and board 7 is shifted by a quarter of the pitch L in every movement of the frame 4. Then, an apparent pitch of the photo-detectors 6 becomes L/4 and a size of the article W in the Y direction can be measured with a resolution of L/4, i.e. 1 mm.

Moreover, a photo-sensor device may be provided on one of the upright posts 4c and a light projecting device is provided on the other upright post 4c, a height of the article W may be measured by processing output signals supplied from the photo-sensor device provided on the upright post 4c.

Figure 5:
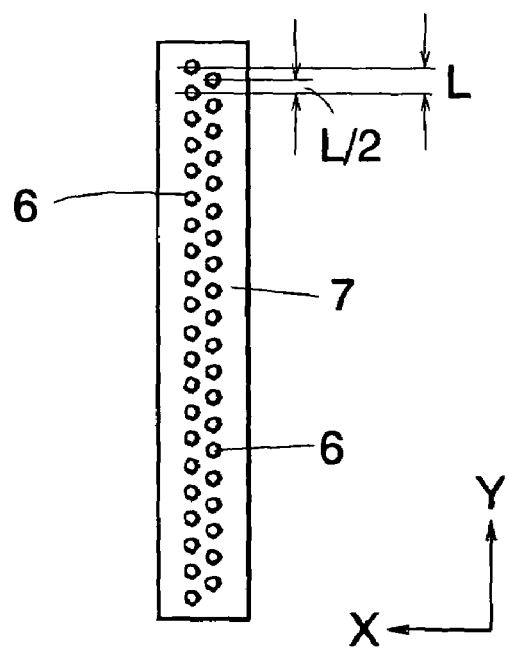
FIG. 5 is a schematic view expressing an arrangement of photo-detectors of another embodiment.

FIG. 5 is a plan view showing an arrangement of photo-detectors 6 in the photo-sensor device 5 of another embodiment of the measuring apparatus according to the invention. It should be noted that the photo-detectors 6 could not be arranged into a single array at a pitch smaller than a size of a photo-detector in the Y direction, because photo-detectors could not be overlapped with each other. In the present embodiment, photo-detectors 6 are arranged into two rows and one of the two rows is shifted in the Y direction by a half of the pitch L. Then, the photo-detectors 6 are arranged into a zigzag manner. In the present embodiment, the pitch L of the photo-detectors 6 in each rows is set to 4 mm and the two rows are shifted by L/2=2 mm in the Y direction. Therefore, a resolution of the photo-sensor device 5 is 2 mm. When this photo-sensor device 5 is used and the board 7 supporting the photo-detectors 6 is shifted over a distance of 1 mm, a resolution of 1 mm can be obtained.

In general, when photo-detectors are arranged at a pitch L to form n rows which are relatively shifted in the Y direction by a distance L/n (n≧2), and the photo-sensor device 5 is shifted in the Y direction over a distance by L/2n, the measurement can be carried out with a resolution equal to L/2n.

In the above explained embodiment, the photo-detector device 5 is provided on the upper horizontal portion 4a of the frame 4 and the light projecting device 8 is provided on the lower horizontal portion 4b of the frame 4. According to the invention, the photo-detector device 5 may be provided on the lower horizontal portion 4b of the frame 4 and the light projecting device 8 may be arranged on the upper horizontal portion 4b of the frame 4. Furthermore, in the above embodiment, the article W is placed on the stationary glass plate 2 and the frame 4 is reciprocally moved to optically scan the article W.

According to the invention, the article W may be reciprocally moved while the frame 4 is remained stationary. Moreover, in the above embodiment, the light projecting device 8 is formed by a plurality of light emitting elements, but according to the invention, the light projecting device may be formed by a combination of a single light source and optical fibers. Furthermore, the board 9 on which the light emitting elements 10 may be shifted in the Y direction over a distance of L/2 in conjunction with the shift of the photo-sensor device 5.

As explained above, the measuring apparatus according to this invention has capability for precisely measuring sizes of articles with a high resolution using a smaller number of photo-detectors by mutually moving the article and the photo-sensor device and light projecting device in a reciprocal manner in the X direction and the photo-detector array is sifted in the Y direction perpendicular to the X direction in successive strokes in the reciprocal movement.

What is claimed is:

1. An apparatus for measuring sizes of articles comprising:
   a light projecting device for projecting light toward an article from one side of an article;
   a photo-sensor device arranged on the other side of the article and including a plurality of photo-detectors arranged in array in a first direction such that light projected from the light projecting device and impinging upon the photo-sensor device without being interrupted by the article is received by one or more photo-detectors;
   a driving device for reciprocally moving the light projecting device and photo-sensor device relative to the article in a second direction perpendicular to the first direction;
   a shifting device for shifting the photo-sensor device in the first direction into at least first and second positions which are mutually separated by a distance smaller than a pitch at which the photo-detectors are arranged in array;
   a control device for controlling the driving device and shifting device such that when the light projecting device and photo-sensor device are moved by the driving device in a forward direction, the photo-sensor device is in the first position and when the light projecting device and photo-sensor device are moved by the driving device in a backward direction, the photo-sensor device is in the second position; and
   a signal processing device for processing output signals generated from the photo-detectors under a control of a control signal supplied from the control device to measure size of the article with a resolution higher than the pitch at which the photo-detectors are arranged in array.

2. The apparatus according to claim 1, wherein the photo-detectors in the photo-sensor device are arranged into a single array with the pitch L and the photo-sensor device is shifted in the second direction over a distance of L/2.

3. The apparatus according to claim 1, wherein the photo-detectors in the photo-sensor device are arranged into n (n is integer equal to or larger than 2) rows with the pitch L and the n rows of photo-detectors are relatively shifted in the second direction by a distance L/n, and the photo-sensor device is shifted in the second direction over a distance of L/2n.

4. The apparatus according to claim 2, wherein the article is placed on a transparent plate and the light projecting device and the photo-sensor device are arranged on respective sides of the transparent plate.

5. The apparatus according to claim 4, wherein the transparent plate is arranged stationary and the light projecting device and photo-sensor device are arranged movably in the first direction.

6. The apparatus according to claim 5, wherein the light projecting device is provided on a lower horizontal portion of a frame and the photo-sensor device is provided on an upper horizontal portion of the frame, and the frame is arranged movably in the first direction.

7. The apparatus according to claim 1, wherein the light projecting device includes plural light emitting elements arranged in the second direction to project a substantially parallel light flux.

8. The apparatus according to claim 7, wherein the number of the light emitting elements is identical with that of the photo-detectors, and the light emitting elements are arranged in array to be corresponding to respective photo-detectors one by one.

9. The apparatus according to claim 8, wherein the array of the light emitting elements is shifted in the second direction together with the photo-sensor device.

10. The apparatus according to claim 3, wherein the article is placed on a transparent plate and the light projecting device and the photo-sensor device are arranged on respective sides of the transparent plate.

11. The apparatus according to claim 10, wherein the transparent plate is arranged stationary and the light projecting device and photo-sensor device are arranged movably in the first direction.

12. The apparatus according to claim 11, wherein the light projecting device is provided on a lower horizontal portion of a frame and the photo-sensor device is provided on an upper horizontal portion of the frame, and the frame is arranged movably in the first direction.

* * * * *